(12) United States Patent
Totsuka

(10) Patent No.: US 7,573,255 B2
(45) Date of Patent: Aug. 11, 2009

(54) METER

(75) Inventor: Shigeki Totsuka, Shimada (JP)

(73) Assignee: Yazaki Corporation, Tokyo (JP)

( * ) Notice: Subject to any disclaimer, the term of this patent is extended or adjusted under 35 U.S.C. 154(b) by 369 days.

(21) Appl. No.: 11/702,225

(22) Filed: Feb. 5, 2007

(65) Prior Publication Data

US 2007/0190832 A1    Aug. 16, 2007

(30) Foreign Application Priority Data

Feb. 10, 2006    (JP)    ............................ P2006-033264

(51) Int. Cl.
*G01R 1/20*    (2006.01)
(52) U.S. Cl. .................................................... 324/146
(58) Field of Classification Search ................. 439/517; 324/144, 146, 151 R, 151 A, 155, 154 PB, 324/164
See application file for complete search history.

(56) References Cited

U.S. PATENT DOCUMENTS

| | | | |
|---|---|---|---|
| 4,838,146 A | 6/1989 | Stoll | 92/5 R |
| 5,128,575 A | 7/1992 | Heidelberg et al. | 310/156 |
| 6,484,663 B2 * | 11/2002 | Zech et al. | 116/284 |
| 6,940,269 B2 * | 9/2005 | Komura | 324/146 |
| 7,347,160 B2 * | 3/2008 | Honma et al. | 116/288 |
| 2003/0038227 A1 | 2/2003 | Sesek et al. | 250/208.1 |
| 2007/0194901 A1 | 8/2007 | Ziegler et al. | 340/461 |

FOREIGN PATENT DOCUMENTS

| | | |
|---|---|---|
| DE | 36 09 605 A1 | 9/1987 |
| DE | 38 06 760 A1 | 9/1989 |
| DE | 102 36 693 A1 | 3/2003 |
| DE | 103 25 793 A1 | 12/2004 |
| FR | 2 790 552 | 8/2000 |
| JP | 2000-131099 | 5/2000 |
| JP | 2005-91032 | 4/2005 |
| JP | 2005-106588 | 4/2005 |

* cited by examiner

*Primary Examiner*—Neil Abrams
(74) *Attorney, Agent, or Firm*—Morgan, Lewis & Bockius LLP

(57) ABSTRACT

A hollow box-shaped mover or a needle is moved, without using a power transmission mechanism midway, to a portion according to a measured value of a graduation portion, by housing the mover between a dial and a surrounding facing and in a guide groove portion formed along a graduation portion, in a manner to move along the guide groove portion, by attaching a needle to the mover, and by moving the mover along the guide groove portion by a linear motor unit, which is constituted to have a multipolar magnet of the guide groove portion and two coils housed in the mover.

7 Claims, 22 Drawing Sheets

METER

BACKGROUND OF THE INVENTION

1. Field of the Invention

The present invention relates to a centerless meter for indicating such a portion of a graduation portion arranged on a dial associated with a measured value, with a needle extending from the outer side to the inner side of the graduation portion.

2. Related Art

In the centerless meter used in the combination meter or the like of a vehicle, for example, the needle arranged on the surface side of the dial is connected to an annular or arcuate ring gear arranged on the back of the dial, and the ring gear is driven to slide on its extension by the motor thereby to move the needle (e.g., JP-A-2000-131099). The needle is connected to a loop member such as a belt or ball chain arranged on the back of the dial, in place of the ring gear, so that the loop member is circumferentially driven by the motor or pulley thereby to move the needle (e.g., JP-A-2005-91032 and JP-A-2005-106588).

In any of the aforementioned centerless meters of the related art, the power of the motor is transmitted to the needle through a power transmission mechanism such as the ring gear or the loop member. This makes it necessary to select and design the constitution of the power transmission mechanism in accordance with the layout of the moving area of the needle on the meter.

SUMMARY OF THE INVENTION

The invention has been conceived in view of the background thus far described, and has an object to provide a centerless meter for indicating such a position of a graduation portion arranged on a dial associated with a measured value, with a needle extending from the outer side to the inner side of the graduation portion, and to minimize the necessity for selecting and designing the constitution according the layout of the moving area of the needle over the meter.

In order to achieve the aforementioned object, according to one aspect of the invention, there is provided a centerless meter for indicating a position of a graduation portion arranged on a dial associated with a measured value, with a needle extending from an outer side to an inner side of the graduation portion, including:

a guide groove portion formed in the outer side of the dial and extending along the graduation portion;

a mover housed in the guide groove portion so as to be movable along the guide groove portion;

the needle attached to the mover; and a moving device for moving the mover relative to the guide groove portion and along the guide groove portion, wherein the moving device includes:

a multipolar magnet attached to a first member that is one of the guide groove portion and the mover and having at least one set of N-poles and S-poles arranged adjacent to each other;

a coil attached to a second member that is the other of the guide groove portion and the mover for generating magnetic poles at the poles arranged to confront the multipolar magnet; and a power source for switchably energizing the coil such that magnetic poles are generated alternately over successive ones of the poles; and the multipolar magnet or the coil attached to the guide groove portion are arranged in the guide groove portion over a whole moving range in which the mover moves in the guide groove portion.

In another aspect of the invention, the first member is the guide groove portion and the second member is the mover, the N-poles and the S-poles of the multipolar magnet to be attached to the guide groove portion are arranged alternately in a plurality of sets over the whole moving range of the mover in the guide groove portion, the mover carries the coils by two, and the successive ones of the poles of each coil confront the multipolar magnet with a spacing of one half of the spacing the adjoining N-pole and S-pole of the multipolar magnet along the guide groove portion.

In another aspect of the invention, the first member is the guide groove portion and the second member is the mover, and the coil carried by the mover is connected with a leading end of an electric wiring, which is let off from a first end side to a second end side of the moving range of the mover in the guide groove portion and which can reach the coil in case the mover is positioned at the second end of the guide groove portion.

In another aspect of the invention, a tension mechanism may be further included for urging the leading end of the electric wiring from the second end side toward the first end side of the guide groove portion.

In another aspect of the invention, the first member is the guide groove portion and the second member is the mover, a feeding conductive pattern extends in the guide groove portion over the whole moving range of the mover, and the mover is provided with an electric receiving brush electrically connected with the coil by sliding on the feeding conductive pattern associated with movement of the mover along the guide groove portion.

In another aspect of the invention, the first member is the mover and the second member is the guide groove portion, and the individual poles of the coil to be attached to the guide groove portion are arranged over the whole moving range of the mover in the guide groove portion at a predetermined spacing from the successive poles along the guide groove portion, the multipolar magnet is attached to the mover, and the adjoining N-pole and S-pole of the multipolar magnet are arranged at a spacing twice as long as the predetermined spacing along the guide groove portion.

In another aspect of the invention, the coil includes one or more coil assemblies, in which yokes having a plurality of poles arranged at a predetermined spacing along the guide groove portion are individually arranged on two ends of a center axis direction of the coil with a displacement corresponding to one half of the predetermined spacing along the guide groove portion.

According to the invention, when the energizing direction of the power source to the coil is changed, the magnetic poles of the poles of the coils to confront the N-pole and the S-pole of the multipolar magnet are switched to move one of the coil and the multipolar magnet moves relative to the other over the whole moving range of the mover in the guide groove portion so that the position on the graduation portion, as indicated by the needle carried by the mover, changes according to the moving position of the mover in the guide groove portion extending along the graduation portion.

Without any power transmission mechanism being midway, therefore, the power by the moving device is transmitted to the mover or the needle, thereby to minimize the necessity for selecting and designing the constitution of the power transmission mechanism according the layout of the moving area of the needle over the meter.

In the invention, the multipolar magnet may be attached to the guide groove portion, and the coil may be carried on the mover. In this constitution, the individual poles of the two coils of the mover to control the multipolar magnet, as alternately arranged in a plurality of sets over the whole moving range of the mover, are arranged at the spacing of one half of that between the adjoining N-pole and S-pole of the multipolar magnet. As a result, the position of the mover can be managed in a resolution twice as high as that of the spacing of the multipolar magnet by the energization of the coils by the power source.

In the invention, in case the multipolar magnet is attached to the guide groove portion and in case the coil is carried on the mover, the coil can be fed with the electric power by the electric wiring which is let off from one end side to the other end side along the guide groove portion and which has such a length as can reach the coil even when the mover is positioned at the most distant other end of the guide groove portion.

In the invention, in case the multipolar magnet is attached to the guide groove portion, the electric power is fed to the coil by the electric receiving brush of the mover sliding over the feeding conductive pattern extending in the guide groove portion over the whole moving range of the mover, so that the electric power can be reliably fed to the coil of the mover independently of the position of the mover in the guide groove portion.

In the meter of the invention, the electric wiring may be let off by the biasing force of the tension mechanism along the guide groove portion from one end side to the other end side of the same by the length according to the position of the mover in the guide groove portion so that the electric wiring of the excessive length can be prevented from being excessively let off along and from the one end side to the other end side of the guide groove portion and from being entangled and from being damaged or broken.

In the invention, the coil may be attached to the guide groove portion, and the multipolar magnet may be carried on the mover. In this constitution, the N-poles and S-poles of the multipolar magnets of the mover to confront the individual poles of the coils, as arranged over the whole moving range of the mover, are arranged at the spacing twice as long as that between the successive poles of the multipolar magnet. As a result, the position of the mover can be managed in a resolution twice as high as that of the spacing of the multipolar magnet by the energization of the coils by the power source.

In the invention, as arranged individually at the two ends of the coil assembly in the center axis direction of the coil, displaced along the guide groove portion by one half of the distance between the successive poles of each yoke. Thus, the poles of the coils care arranged at a predetermined spacing equal to the spacing between the successive poles of each yoke and one half of the spacing between the N-pole and the S-pole of the multipolar magnet. As a result, the position of the mover can be managed in a high resolution without forming the poles in a small spacing in a single yoke.

DETAILED DESCRIPTION OF THE PREFERRED EMBODIMENTS

Embodiments of a meter of the invention are described in the following with reference to the accompanying drawings.

Figure 1:
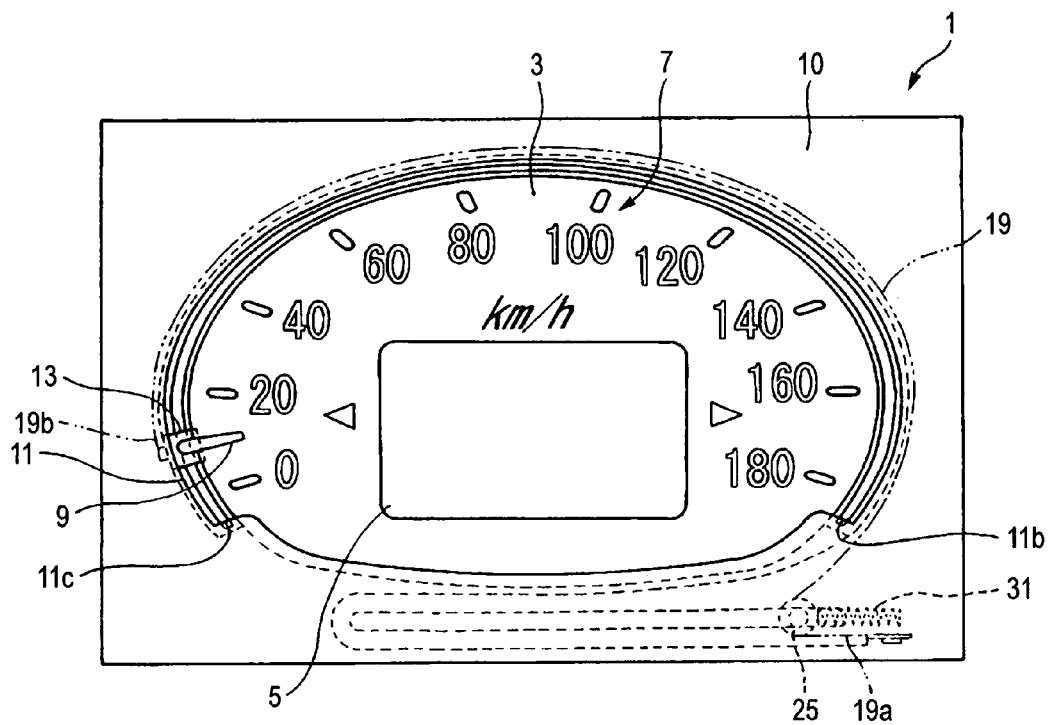
FIG. 1 is a front elevation of a meter according to a first embodiment of the invention.

FIG. 1 is a front elevation of a meter according to a first embodiment of the invention. The meter of this embodiment, as indicated by reference numeral 1 in FIG. 1, has a multi-display unit 5 of a liquid crystal display or the like at the center of a dial 3. Thus, the meter 1 adopts the centerless type, in which a graduation portion 7 arranged in an arcuate shape around the multi-display unit 5 is indicated by a needle 9 extending inward from the outer side of the graduation portion 7.

Between the dial 3 and a surrounding facing 10 and along the graduation portion 7, there is formed a guide groove portion 11, in which a mover 13 of a hollow box shape is so fitted as can move along the guide groove portion 11. The needle 9 is attached to the mover 13.

Moreover, the needle 9 is constituted to indicate a portion corresponding to the measured value of the graduation portion 7, when the mover 13 is moved along the guide groove portion 11 by a linear motor unit which is disposed across the guide groove portion 11 and the mover 13.

Figure 2:
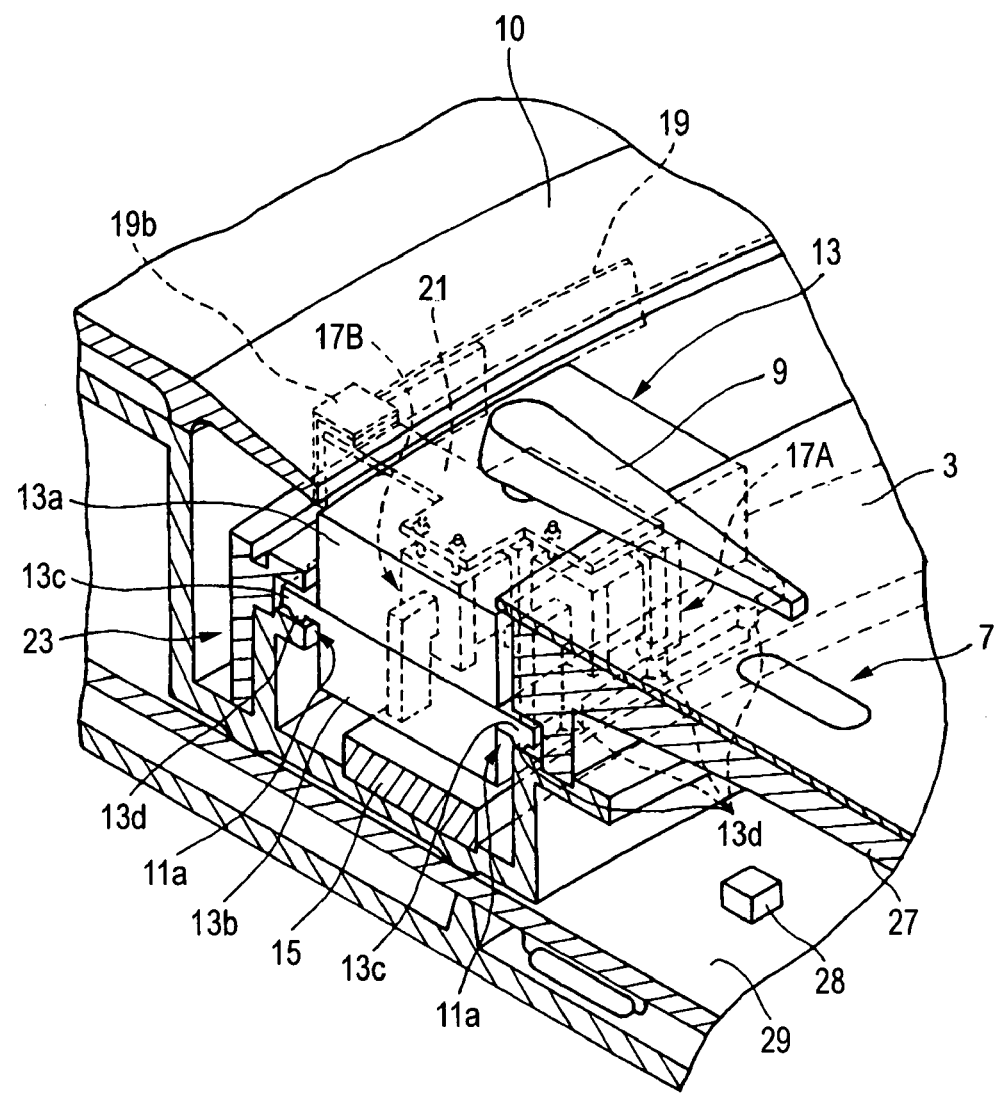
FIG. 2 is a partially cut-away perspective view showing the inside of a guide groove portion, as shown in FIG. 1, in an enlarged scale.

The linear motor unit is constituted, as shown in a partially cut perspective view of FIG. 2 showing the inside of the guide groove portion 11 in an enlarged scale, to include a multipolar magnet 15 disposed on the bottom face of the guide groove portion 11 along the whole length, two coils 17A and 17B housed in the mover 13, and an electric wiring 19 for feeding the coils 17A and 17B.

On the two side faces of the guide groove portion 11, there are formed guide rails 11a and 11a, which extend over the whole extension. The mover 13 includes an upper case 13a, to which the needle 9 is attached, and a lower case 13b having guide members 13c and 13c which are individually inserted into and guided by the guide rails 11a and 11a. Each guide member 13c is provided with a plurality of semispherical protrusions 13d, which are so formed at a predetermined spacing as to reduce the areas to contact with the guide rails 11a.

Figure 3:
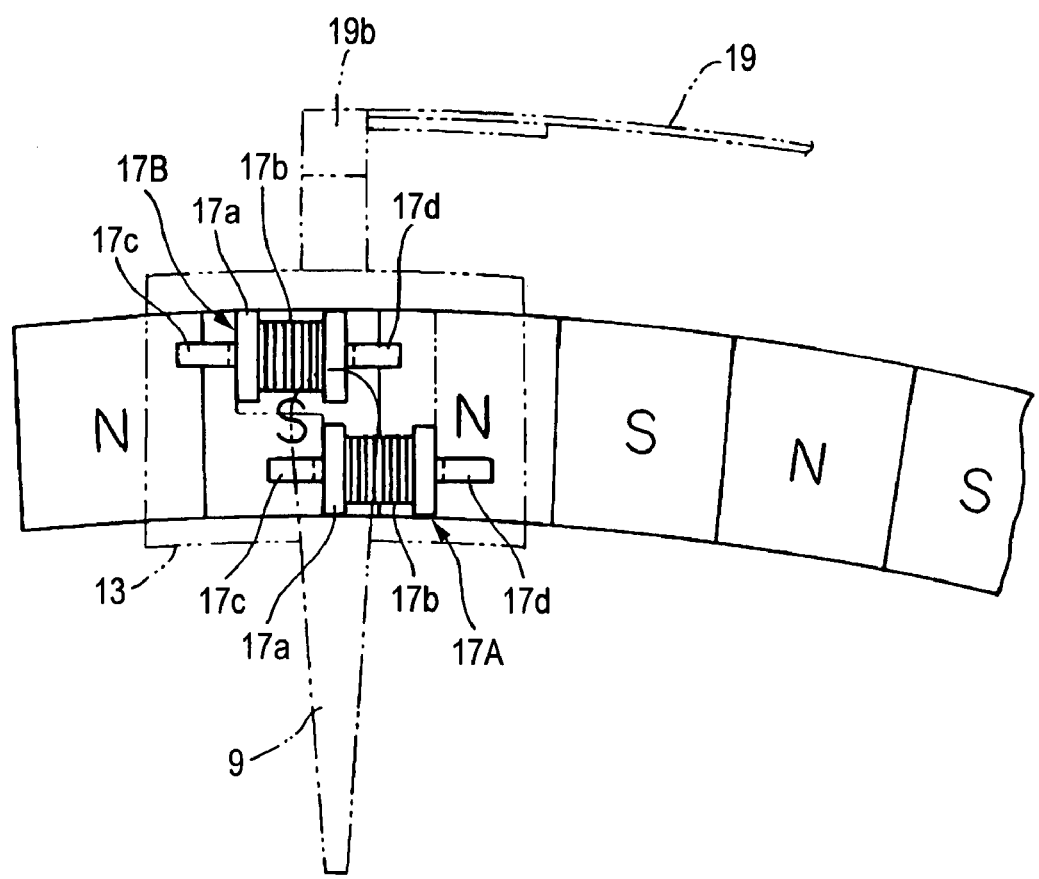
FIG. 3 is an explanatory view showing positional relations between a multipolar magnet and two coils, as shown in FIG. 2.

The multipolar magnet 15 is constituted, as shown as an explanatory diagram in FIG. 3, to have N-poles and S-poles arranged so alternately that the adjoining N-poles and S-poles may be spaced at an equal distance. Each of the coils 17A and 17B includes, as shown as an enlarged exploded perspective diagram in FIG. 4, a coil bobbin 17a having a coil wound thereon, and poles 17c and 17d bent in an L-shape from the two ends of the center axis direction of the coil bobbin 17a and extending to the outside.

The coils 17A and 17B are individually arranged, as shown in FIG. 3, such that the center axes directions of the coil bobbins 17a have their center axis directions aligned with the extending direction of the multipolar magnet 15 (aligned with the extending direction of the guide groove portion 11). The two poles 17c and 17d of each of the coils 17A and 17B are formed to have a spacing equal to that between the adjoining N-pole and S-pole of the multipolar magnet 15.

Moreover, the poles 17c of the coils 17A and 17B and the poles 17d of the coils 17A and 17B, and the poles 17d of the coil 17A and the poles 17c of the coils 17B are so arranged along the multipolar magnet 15 as are shifted in positions by one half of the spacing between the adjoining N-pole and S-pole.

Here, the maximum speed (180 Km/h) of the graduation portion 7 is located on the side of one end 11b of the guide groove portion 11, and the minimum speed (0 Km/h) is located on the side of the other end 11c of the guide groove portion 11, as shown in FIG. 1. As shown in FIG. 3, the coil 17B is then arranged with a displacement of one half of the spacing between the adjoining N-pole and S-pole of the multipolar magnet 15, from the coil 17A to the side of the other end 11c of the guide groove portion 11.

Figure 5:
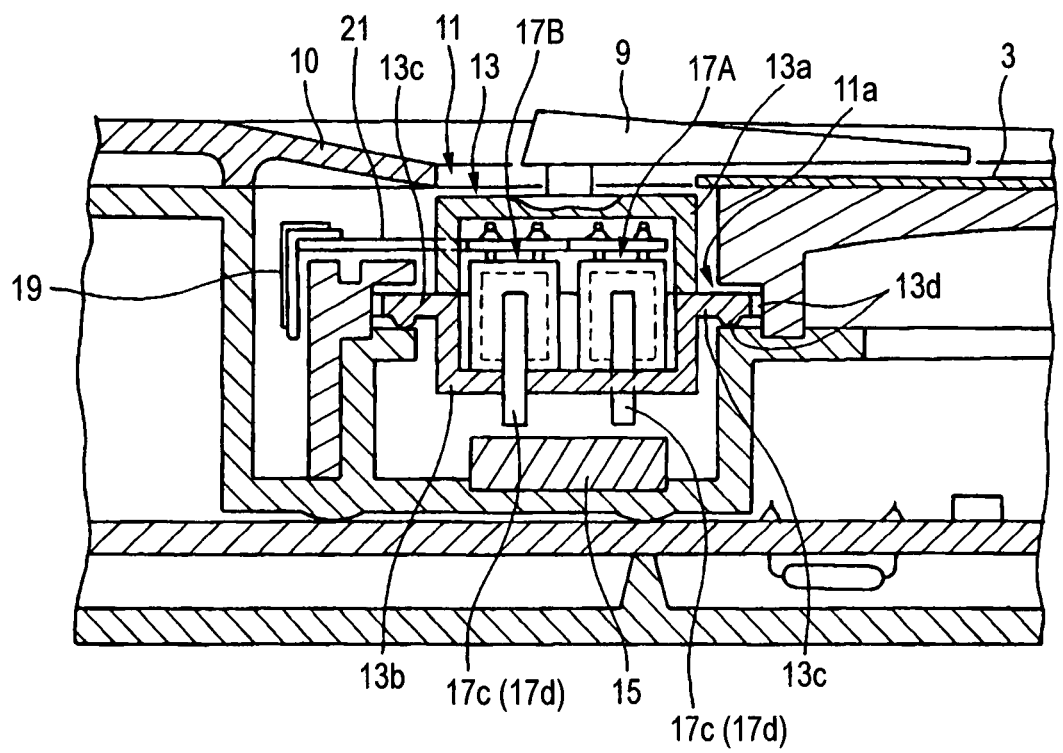
FIG. 5 is an enlarged sectional view showing the inside of the guide groove portion shown in FIG. 1.

The leading end of each of the poles 17c and 17d is protruded to the outside from the lower case 13b of the mover 13, as shown as an enlarged sectional diagram in FIG. 5, and confronts the multipolar magnet 15 such that the guide members 13c and 13c of the mover 13 are inserted into and guided by the guide rails 11a and 11a of the guide groove portion 11.

In the state where the poles 17c of the coils 17A and 17B individually confront the N-poles (or the S-poles) of the multipolar magnet 15 and the adjoining S-poles (or the needle 9) on the side of the other end 11c of the guide groove portion 11, therefore, the poles 17d of the coils 17A and 17B individually confront the boundaries between the N-poles of the multipolar magnet 15 and the adjoining S-poles on the side of the other end 11c of the guide groove portion 11 (i.e., the boundaries between the adjoining S-poles and N-poles) and the boundaries between the S-poles and the adjoining hp on the side of the other end 11c of the guide groove portion 11 (i.e., the boundaries between the adjoining N-poles and S-poles).

In the state where the poles 17c of the coils 17A and 17B individually confront the boundaries between the N-poles of the multipolar magnet 15 and the S-poles on the side of the other end 11c of the guide groove portion 11 (i.e., the boundaries between the S-poles and the N-poles on the side of the other end 11c of the guide groove portion 11 and the boundaries between the S-poles and the N-poles on the side of the other end 11c of the guide groove portion 11 (i.e., the boundaries between the N-poles and the S-poles on the side of the other end 11c of the guide groove portion 11), on the other hand, the poles 17d of the coils 17A and 17B individually confront the N-poles (or the S-poles) of the multipolar magnet 15 and the S-poles (or the N-poles) on the side of the other end 11c of the guide groove portion 11.

Figure 4:
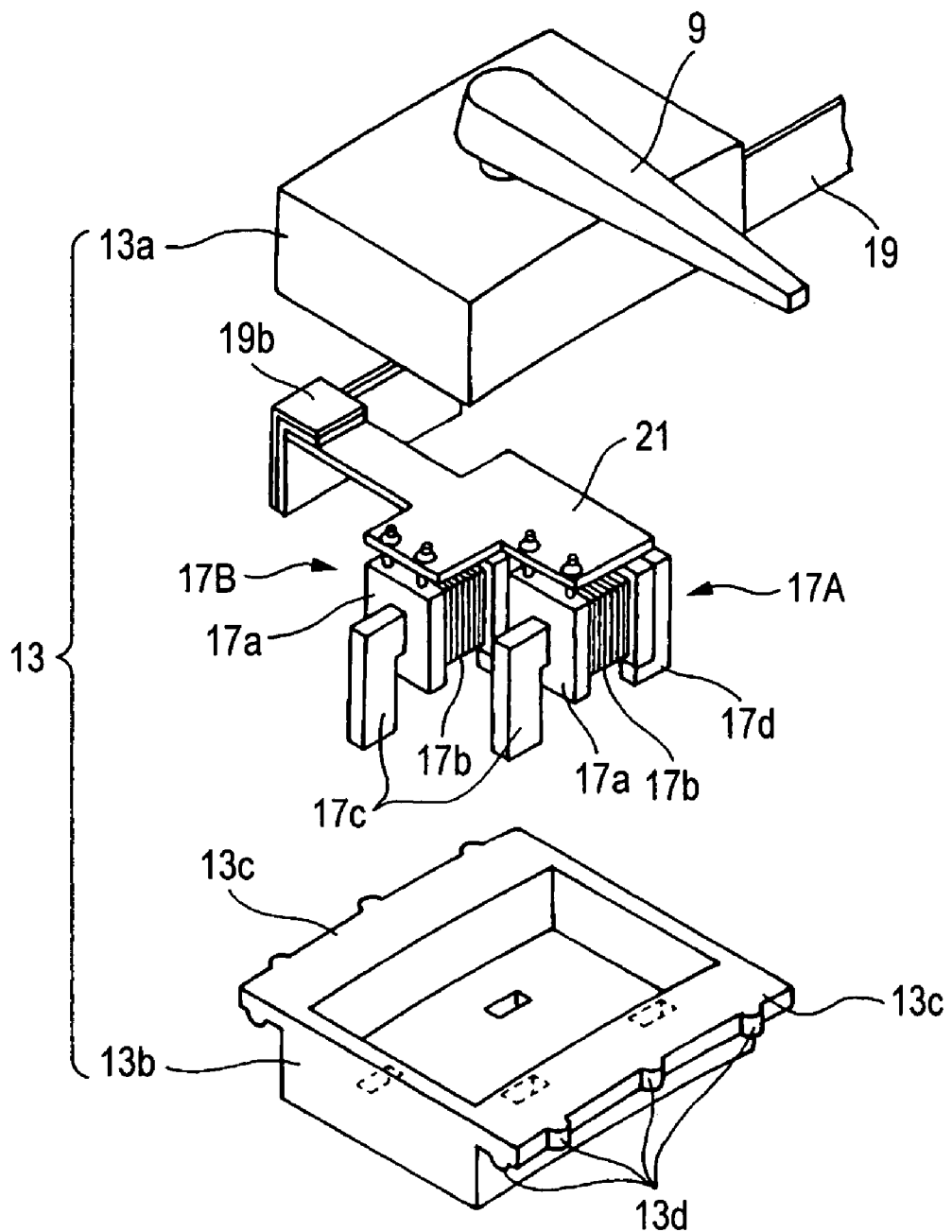
FIG. 4 is an exploded perspective view showing the mover, as shown in FIG. 2, in an enlarged scale.
Figure 6:
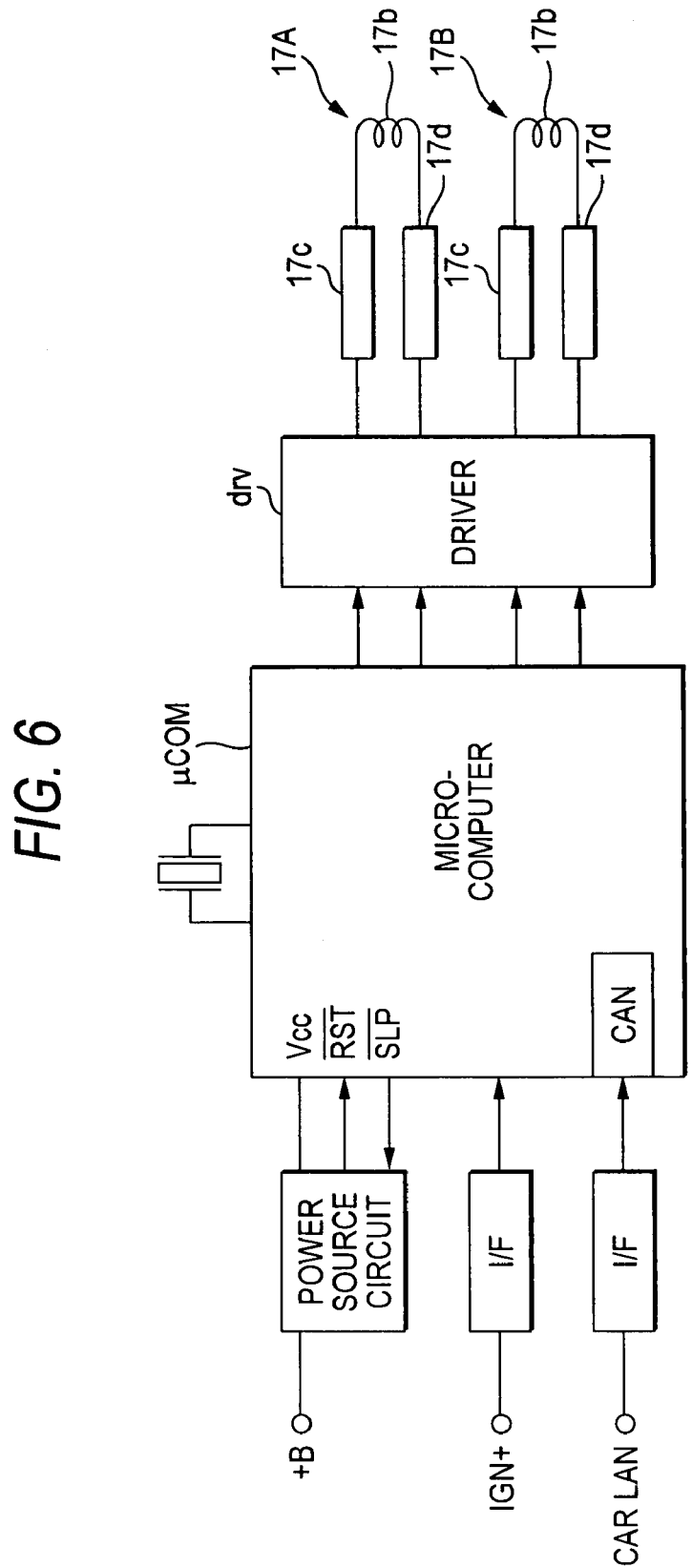
FIG. 6 is a block diagram showing an electrically schematic constitution of the meter shown in FIG. 1.

The coil wires 17b of each of the coils 17A and 17B is fed with the power source for energizing the poles 17c and 17d through a printed circuit board 21, as shown in FIG. 4, and the electric wiring 19 electrically connected with the printed circuit board 21, from a microcomputer (as will be abbreviated as the "micom" μ COM, as shown as a block diagram showing an electric schematic constitution in FIG. 6, or a driver drv.

The power sources, as individually fed from the micom μ COM or the driver drv to the coil wires 17b of the individual coils 17A and 17B, are sinusoidal waves having a phase shift of 90 degrees. The poles 17c and the poles 17d of the individual coils 17A and 17B are energized, when fed with the sinusoidal waves, to the inverted magnetic poles by the magnetic fluxes generated at the coil wires 17b.

Figure 7A:
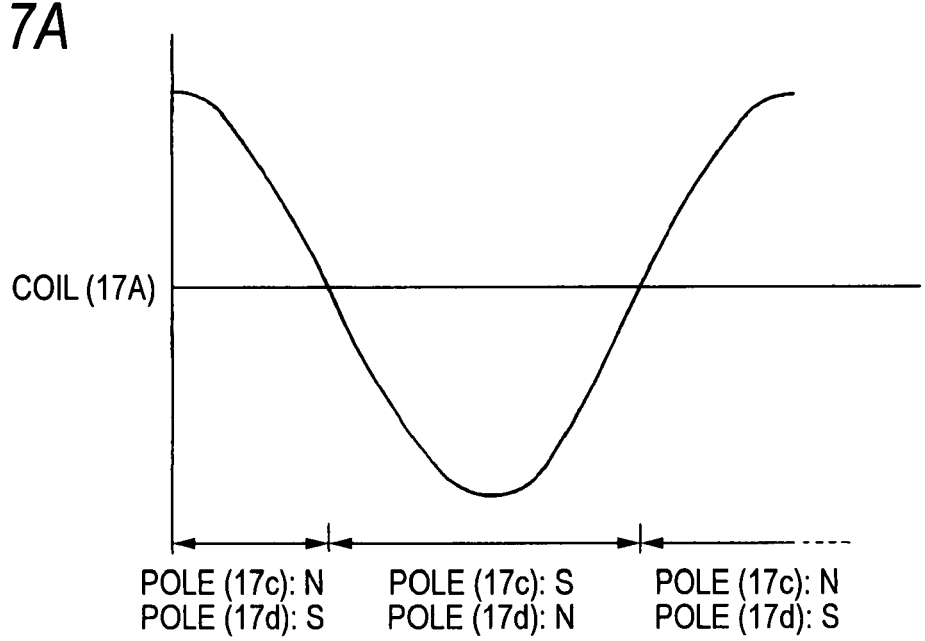
FIGS. 7A and 7B are waveform charts of energization for two coils shown in FIG. 3.
Figure 7B:
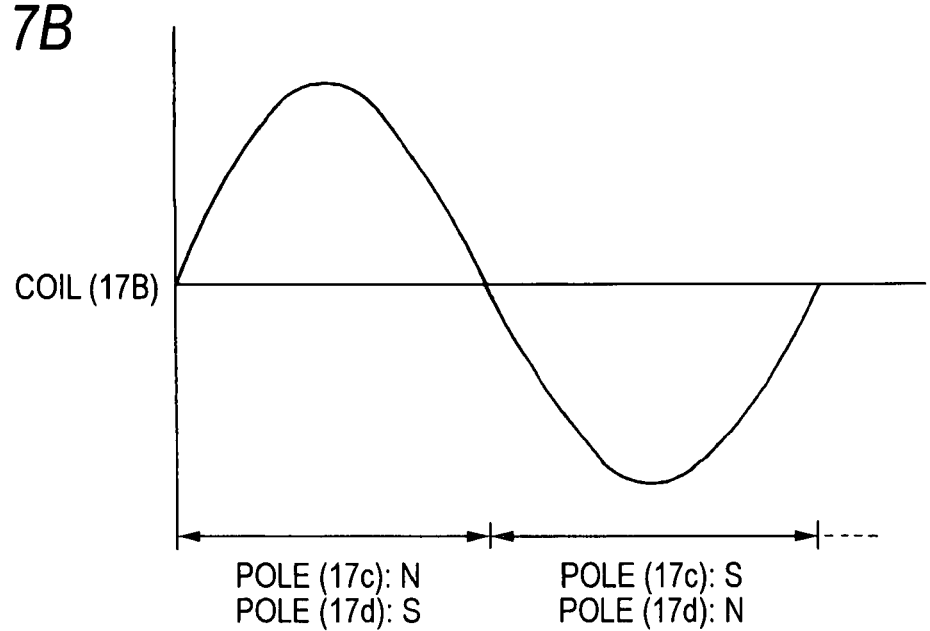

When the phase of the sinusoidal waves to be fed to the coil wires 17b of the coils 17A are advanced by 90 degrees from the sinusoidal waves to be fed to the coil wires 17b of the coils 17B, as shown as waveform charts in FIGS. 7A and 7B, that is, when the coil wires 17b of the coils 17A are fed with the cosine waves, the mover 13 moves from the side of the other end 11c to the side of the one end 11b of the guide groove portion 11 in accordance with the positional relations between the magnetic poles to be generated at the poles 17c and 17d of the individual coils 17A and 17B and the magnetic poles of the multipolar magnet 15, so that the graduation portion 7 indicated by the needle 9 indicates a high speed.

On the contrary, when the phase of the sinusoidal waves to be fed to the coil wires 17b of the coils 17A are advanced by 90 degrees from the sinusoidal waves to be fed to the coil wires 17b of the coils 17B, that is, when the coil wires 17b of the coils 17A are fed with the minus cosine waves, the mover 13 moves from the side of the one end 11b to the side of the other end 11c of the guide groove portion 11 in accordance with the positional relations between the magnetic poles to be generated at the poles 17c and 17d of the individual coils 17A and 17B and the magnetic poles of the multipolar magnet 15, so that the graduation portion 7 indicated by the needle 9 indicates a low speed.

The electric wiring 19 shown in FIG. 2 is made of a flexible band member such as a flexible printed circuit (FPC) or a flexible flat cable (FFC) and is housed in a wire housing groove 23 formed along the outer periphery of the guide groove portion 11 so that it is let off from the side of the one end 11b to the side of the other end 11c of the guide groove portion 11.

Figure 8:
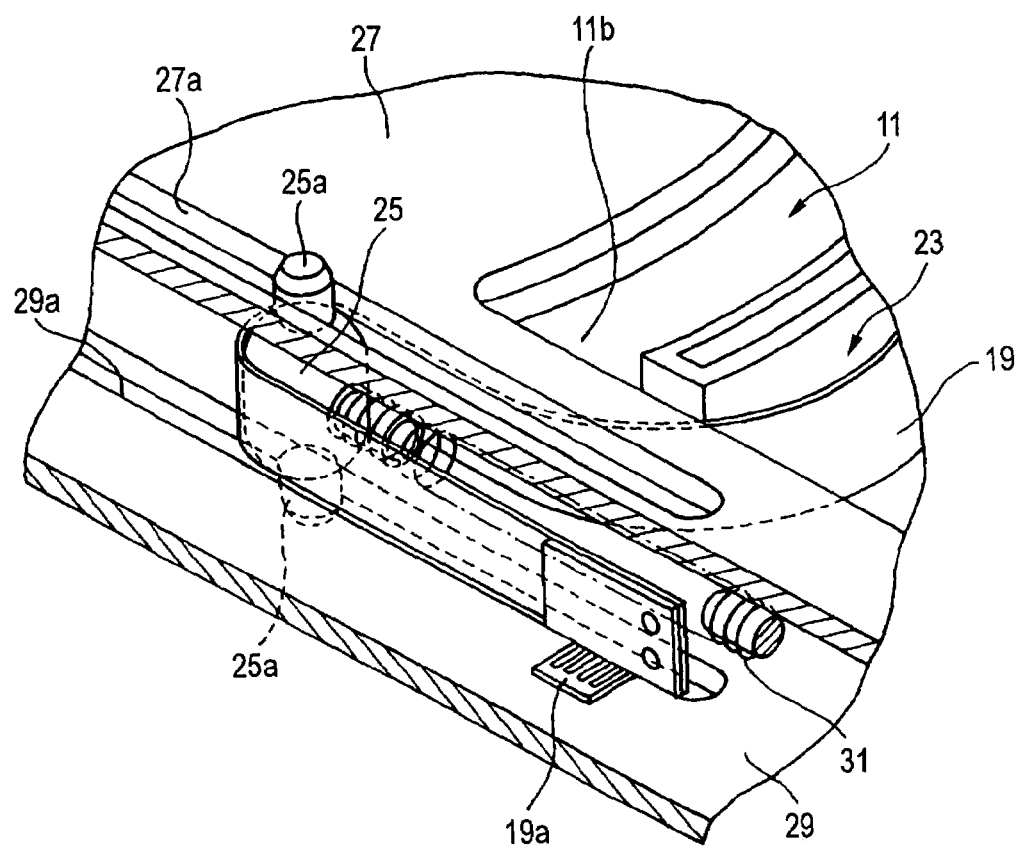
FIG. 8 is an enlarged perspective view of an essential portion of a tension mechanism of the electric wiring shown in FIG. 2.

As shown as an essential portion in an enlarged perspective diagram in FIG. 8, the root end 19a of the electric wiring 19 is positioned outside of the wire housing groove 23 and is fixed. As shown in FIG. 2 and FIG. 4, the electric wiring 19 has its leading end 19b electrically connected with the coil wires 17b of the individual coils 17A and 17B.

The portion of the electric wiring 19 (corresponding to the intermediate portion of claims) between the leading end 19b of the electric wiring 19, as shown in FIG. 2 and FIG. 4, and the root end 19a of the electric wiring 19, as shown in FIG. 8, abuts against a tension roller 25, as shown in FIG. 8.

This tension roller 25 is arranged, as shown in FIG. 8, between a light guide plate 27, as arranged on the back side of the dial 3, as shown in FIG. 3, and a mounting substrate 29 for a light source, as arranged on the back of the former, and is so supported movably in the direction to move to and from the one end 11b of the guide groove portion 11 along the guide holes 27a and 29a by inserting the pins 25a and 25a of the tension roller 25 into guide holes 27a and 29a of the light guide plate 27 and the mounting substrate 29.

Moreover, the tension roller 25 is urged in the direction to leave the one end 11b of the guide groove portion 11 by the elastic force of a coil spring 31 which is fixed at its one end near the fixed portion of the root end 19a of the electric wiring 19.

By this force to urge the tension roller 25 by the coil spring 31, the electric wiring 19 is let off to such an extent into the wire housing groove 23 from the one end 11b to the side of the other end 11c of the guide groove portion 11 associated with the position of the mover 13 in the guide groove portion 11. As a result, the electric wiring 19 is not let off more than that extent into the wire housing groove 23.

Here in the meter 1 of the first embodiment, the tension roller 25 and the coil spring 31 constitute of a tension mechanism of claims.

In the meter 1 of the first embodiment thus constituted, when the coil wires 17b of the individual coils 17A and 17B are energized, the mover 13 moves in the guide groove portion 11 in the direction according to the phase difference of the individual waveforms and to a stroke according to the quantity of energization so that the position, as indicated by the needle 9, on the graduation portion 7 is changed.

At this time, the linear motor unit for moving the mover 13 or the needle 9 is constituted to include the guide groove portion 11 positioned on the outer periphery of the graduation portion 7, the multipolar magnet 15 disposed in the guide groove portion 11, and the two coils 17A and 17B housed in the mover 13. The guide groove portion 11 can be easily formed between the dial 3 and the facing 10, and the coils 17A and 17B can be easily constituted to have the coil bobbins 17a having the coil wires 17b wound thereon and the poles 17c and 17d. As a result, the necessity for selecting and designing the constitution to match the layout of the moving area of the needle 9 over the meter 1 can be suppressed as much as possible to facilitate the constitution and to share the parts.

Here, the meter 1 of the aforementioned first embodiment is constituted such that the multipolar magnet 15 is disposed on the bottom face of the guide groove portion 11, and such that the mover 13, in which the poles 17c and 17d of the individual coils 17A and 17B confronting the multipolar magnet 15 are exposed from the lower case 13b, is guided by the guide rails 11a and 11a of the two side faces of the guide groove portion 11, into which the guide members 13c and 13c of the mover 13 are inserted. However, it is possible to suitably modify the arrangement of the multipolar magnet 15 and the constitution for the guide of the mover 13 in the guide groove portion 11.

Figure 9:
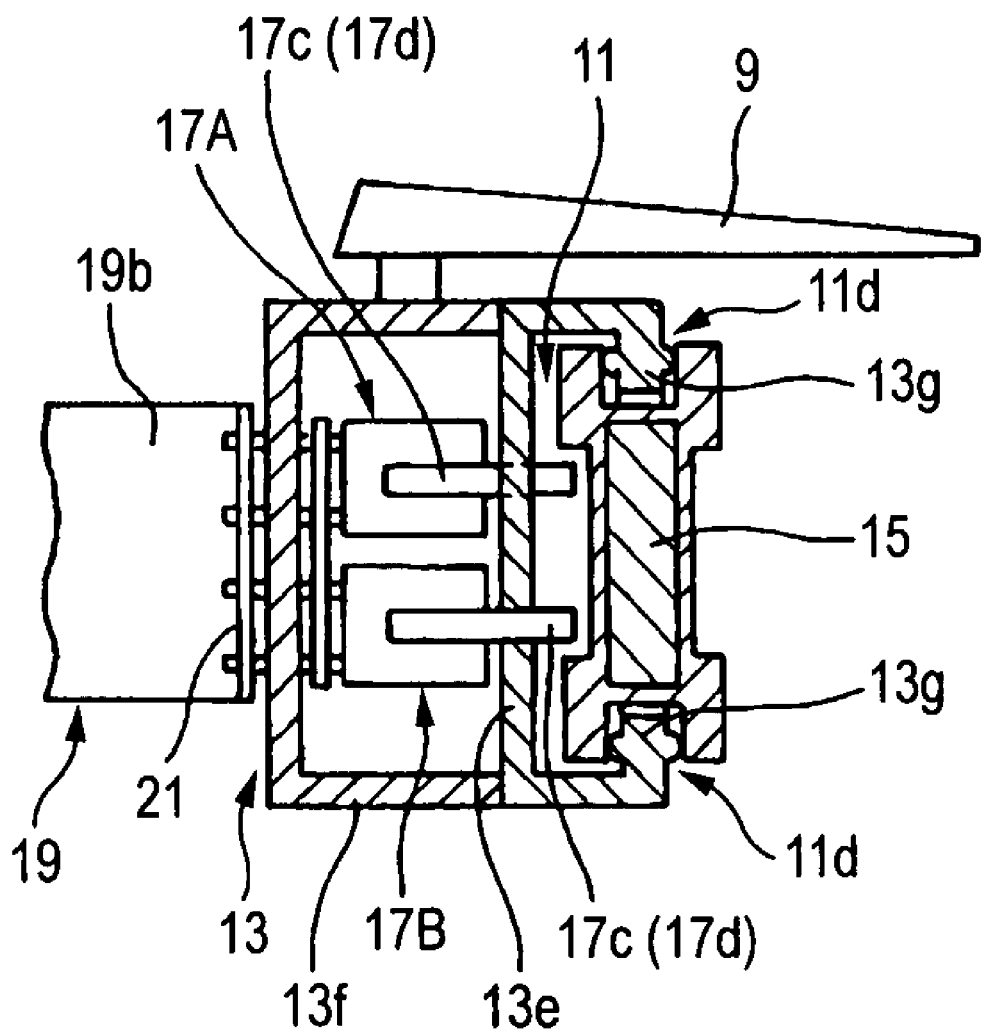
FIG. 9 is an enlarged section of an essential portion of the inside of the guide groove portion of a meter according to a modification of the first embodiment of the invention.

In a modification of the first embodiment, as shown as an essential portion in an enlarged sectional view in FIG. 9, for example, the constitution may be modified such that the multipolar magnet 15 is integrally molded by an insert-molding method or the like inside of the inner side face of the guide groove portion 11, such that upper and lower guide members 13g and 13g formed in an inner case 13e of the mover 13 are inserted into the guide rails 11d and 11d formed above and below the side faces, such that the two coils 17A and 17B are housed in an outer case 13f forming the mover 13 together with the inner case 13e and carrying the needle 9, and such that the leading ends of the poles 17c and 17d of the individual coils 17A and 17B protruded to the outside from the inner case 13e are made to confront the multipolar magnet 15 across the thickness of the inner side faces of the guide groove portion 11.

Figure 10:
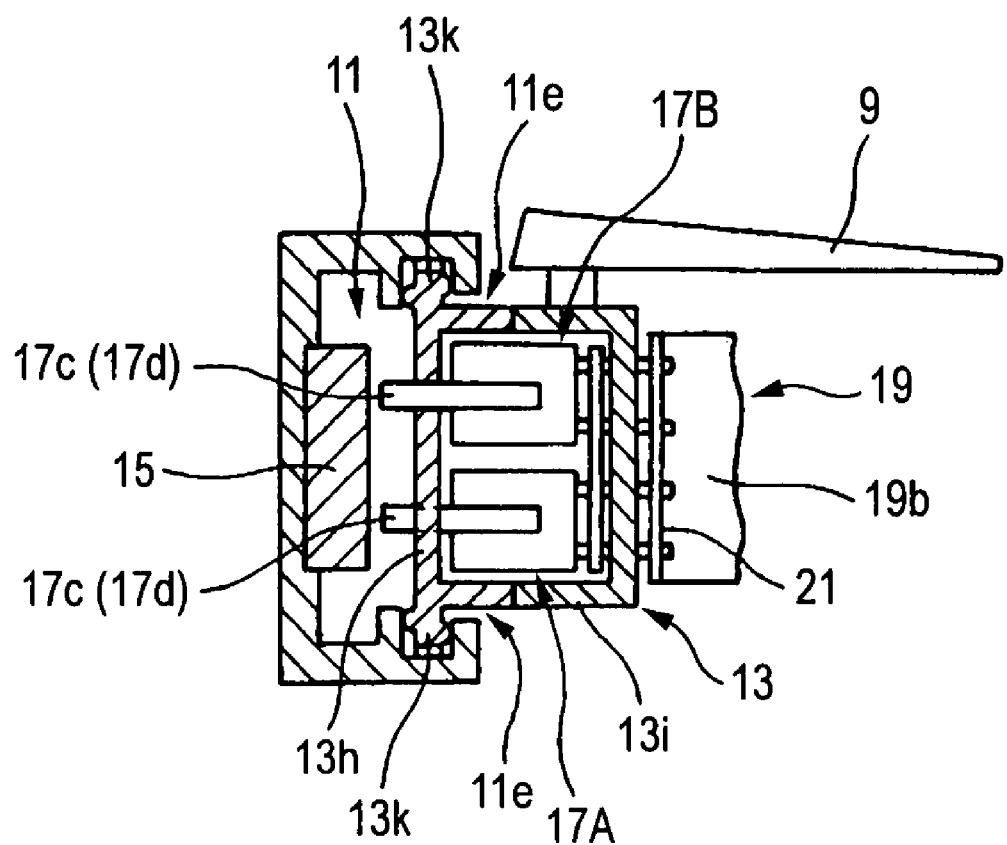
FIG. 10 is an enlarged section of an essential portion of the inside of the guide groove portion of a meter according to another modification of the first embodiment of the invention.

In another modification of the first embodiment, as shown as an essential portion in an enlarged sectional view in FIG. 10, on the other hand, the constitution may be modified such that the multipolar magnet 15 is disposed on the outer side face of the guide groove portion 11, such that upper and lower guide members 13k and 13k formed at an outer case 13h of the mover 13 are inserted into guide rails 11e and 11e formed above and below that side face, such that the two coils 17A and 17B are housed in an inner case 13j forming the mover 13 together with the outer case 13h and carrying the needle 9, and such that the leading ends of the poles 17c and 17d of the individual coils 17A and 17B protruded to the outside from the outer case 13h are made to confront the multipolar magnet 15.

Figure 11:
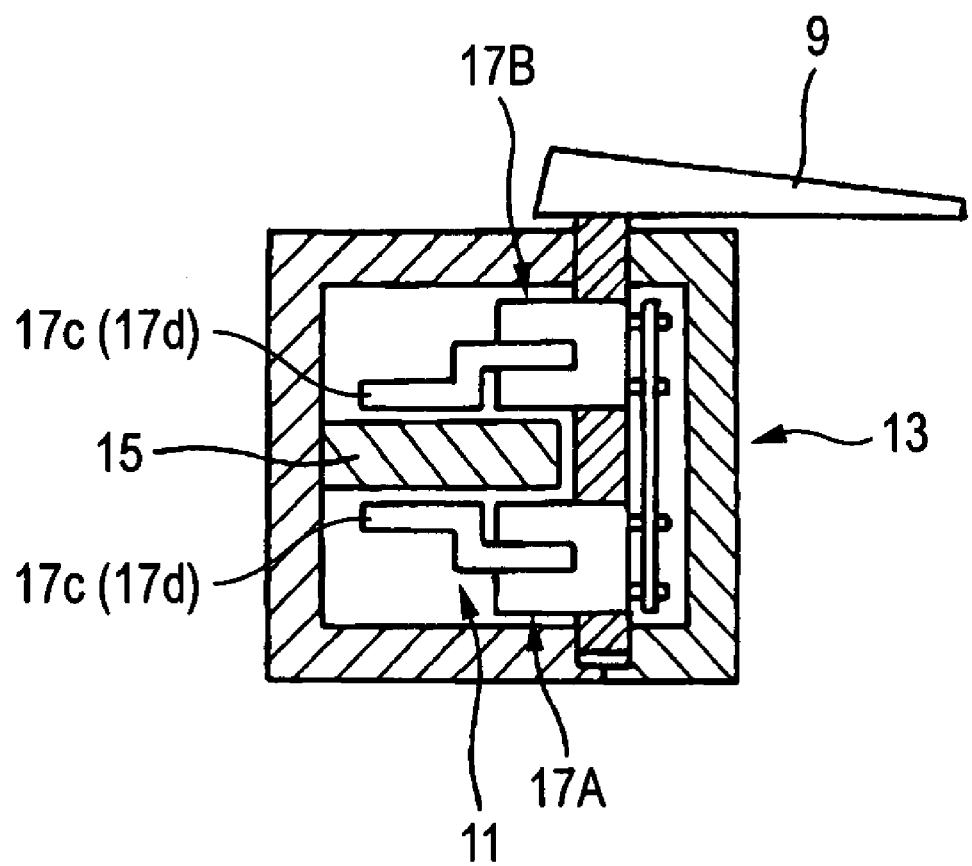
FIG. 11 is an enlarged section of an essential portion of the inside of the guide groove portion of a meter according to another modification of the first embodiment of the invention.

In another modification of the first embodiment, as shown as an essential portion in an enlarged sectional view in FIG. 11, moreover, the constitution may be modified such that the upper and lower two ends of the outer side face of the guide groove portion 11 are extended inward, such that the multipolar magnet 15 is horizontally protruded at the vertically intermediate position of the two ends, and such that the leading ends of the poles 17c and 17d of the two coils 17A and 17B exposed to the outside of the mover 13 are extended vertically of the multipolar magnet 15 thereby to confront each other.

Figure 12:
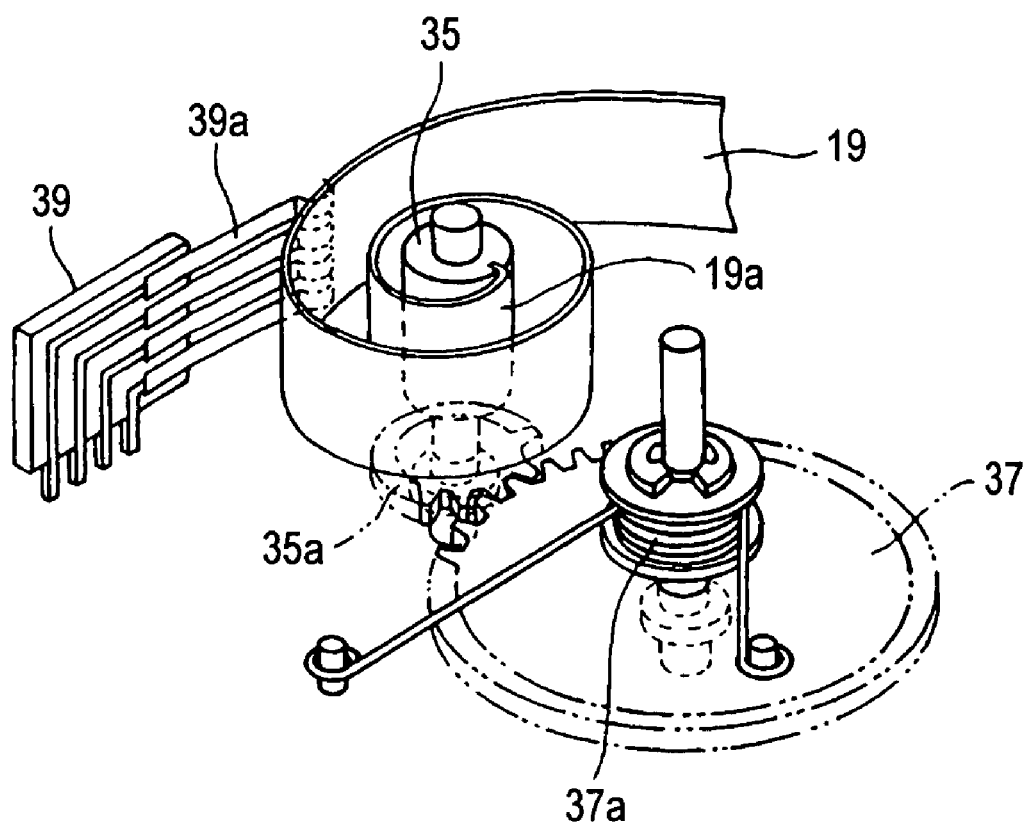
FIG. 12 is an enlarged perspective view of an essential portion of a modification of a tension mechanism of the electric wiring shown in FIG. 2.
Figure 13:
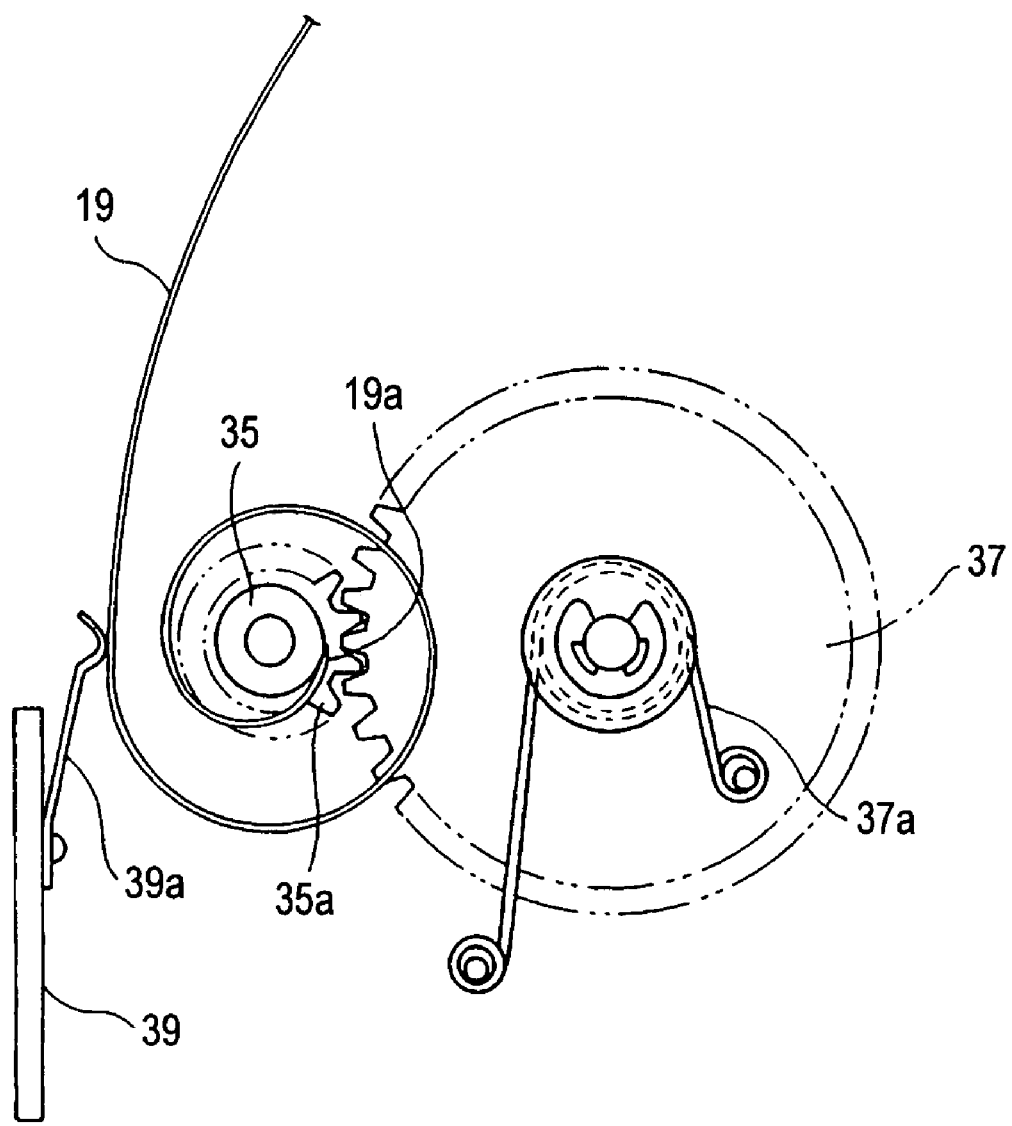
FIG. 13 is an enlarged top plan view of an essential portion of the tension mechanism of FIG. 12.

In the meter 1 of the aforementioned first embodiment, on the other hand, the constitution is made such that the power feed to the coil wires 17b of the individual coils 17A and 17B of the mover 13 is performed by the electric wiring 19. In this case, however, the tension mechanism by the tension roller 25 or the coil spring 31 may be replaced by a winding type tension mechanism, as shown as an essential portion in an enlarged perspective view in FIG. 12 and as an essential portion in an enlarged top plan view in FIG. 13.

In this winding type tension mechanism, a tension gear 37, as urged in one rotational direction by a helical spring 37a, is made to mesh with an intermediate gear 35a on the same shaft of a bobbin 35, to which the root end 19a of the electric wiring 19 is attached, so that the bobbin 35 is urged in the direction to wind the electric wiring 19 by the urging force transmitted through that intermediate gear 35a from the tension gear 37.

Here, it is preferred that the electric wiring 19 of the case using that winding type tension mechanism uses the flexible printed substrate (FPC). The electric contact between the micom μCOM or the driver drv and the electric wiring 19 can be made by bringing a brush 39a extending from a printed circuit board 39 connected with the micom μCOM or the driver drv, into sliding contact with the conductive pattern of the electric wiring 19 wound the outermost circumference of the bobbin 35.

Here, it is arbitrary to omit the aforementioned winding type tension mechanism or the tension mechanism according to the tension roller 25 or the coil spring 31, which has been adopted in the meter 1 of the first embodiment.

However, it is advantageous to provide those tension mechanisms, because the electric wiring 19 of an excessive length in the wire housing groove 23 can be prevented from being let off from the side of the one end 11b of the guide groove portion 11 and entangled and from being damaged or broken.

Figure 14:
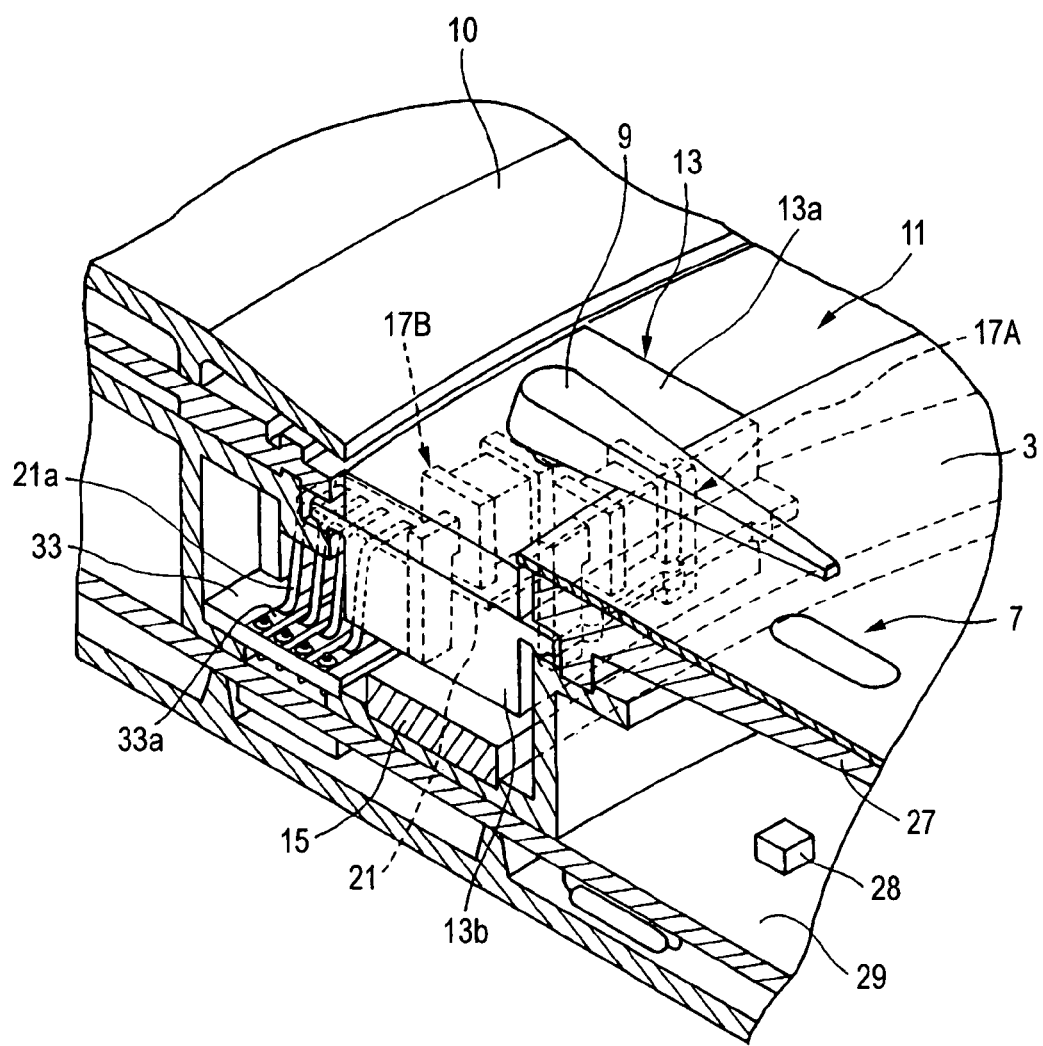
FIG. 14 is a partially cut-away, enlarged perspective view showing an essential portion of the inside of the guide groove portion of a meter according to another modification of the first embodiment of the invention.
Figure 15:
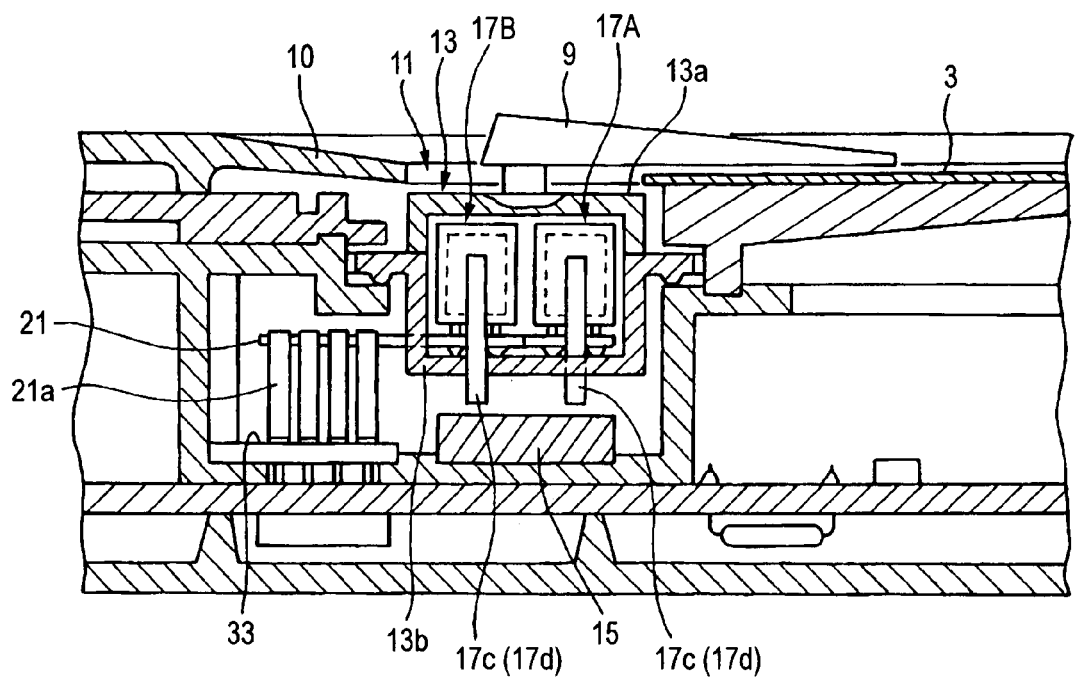
FIG. 15 is an enlarged sectional view showing the inside of the guide groove portion shown in FIG. 14.

Moreover, the electric wiring 19 in the meter 1 of the first embodiment may be replaced by another modification of the first embodiment. FIG. 14 is a partially cut-away perspective view showing the inside of the guide groove portion 11 of the modification of the first embodiment in an enlarged scale, and FIG. 15 is an enlarged section of the same. A brush 21a (corresponding to an electric receiving brush in claims), as connected with the printed circuit board 21, is made to slide over a feeding conductive pattern of a printed circuit board 33, which is juxtaposed to the multipolar magnet 15 on the bottom face of the guide groove portion 11, so that the power may be fed through those brush 21a and printed circuit board 21 to the coil wires 17b of the individual coils 17A and 17B.

This constitution is advantageous, because the electric wiring 19 need not be let off to the position of the mover 13 in the guide groove portion 11 so that the coil wires 17b of the individual coils 17A and 17B can be energized independently of the position of the mover 13 without using any tension mechanism.

Moreover, any of the meters 1 according to the first embodiment or its modifications thus far described is provided with the two coils 17A and 17B. The poles 17c and 17d of the individual coils 17A and 17B having a spacing equal to that between the adjoining N-pole and S-pole of the multipolar magnet 15 are arranged with a displacement of one half of the spacing between the adjoining N-pole and S-pole along the multipolar magnet 15.

By this constitution, the position of the mover 13 in the guide groove portion 11 and the indication position of the needle 9 on the graduation portion 7 can be managed with a resolution twice as high as the spacing between the adjoining N-pole and S-pole of the multipolar magnet 15.

In case such high resolution is not needed, however, the constitution may also be modified to omit either the coil 17A or 17B.

Figure 16:
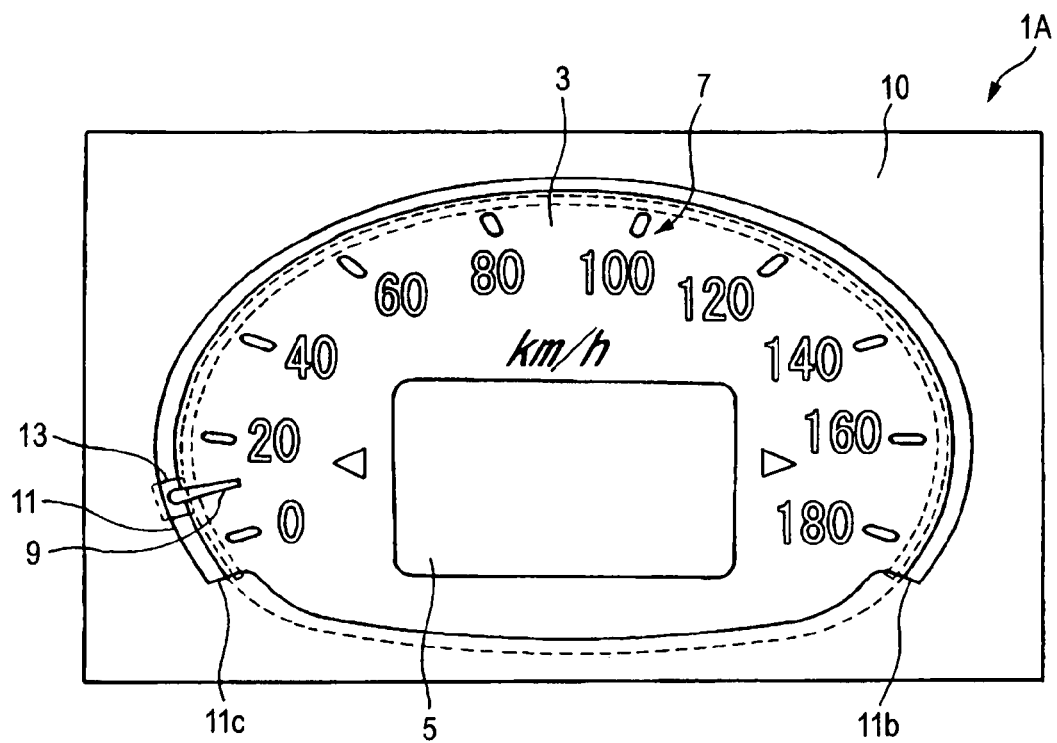
FIG. 16 is a front elevation of a meter according to a second embodiment of the invention.
Figure 17:
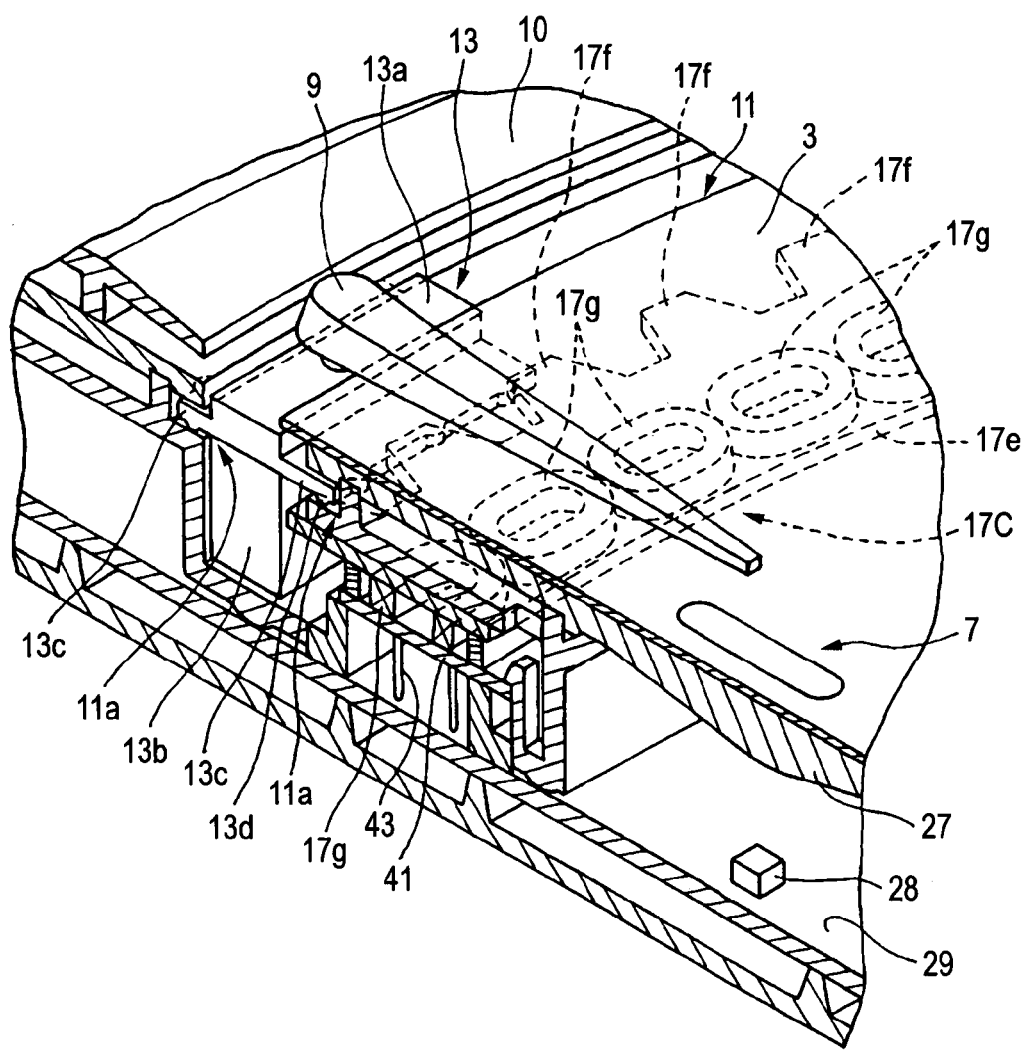
FIG. 17 is a partially cut-away perspective view showing the inside of a guide groove portion, as shown in FIG. 16, in an enlarged scale.

Next, FIG. 16 is a front elevation of a meter according to a second embodiment of the invention. The meter of this embodiment, as designated by reference numeral 1A in FIG. 16, has substantially the same constitution in appearance as that of the meter according to the first embodiment shown in FIG. 1, excepting the internal constitutions of the guide groove portion 11 and the mover 13, which are different from those of the meter 1 according to the first embodiment shown in FIG. 1.

In this meter 1A of this embodiment, moreover, the linear motor unit, as disposed across the guide groove portion 11 and the mover 13, is constituted to include a coil unit 17C disposed in and extending throughout the length of the guide groove portion 11, and a multipolar magnet 15A (as referred to FIG. 18) housed in the mover 13, as shown as a partially cut-away perspective view showing the inside of the guide groove portion 11 in an enlarged scale.

Figure 18:
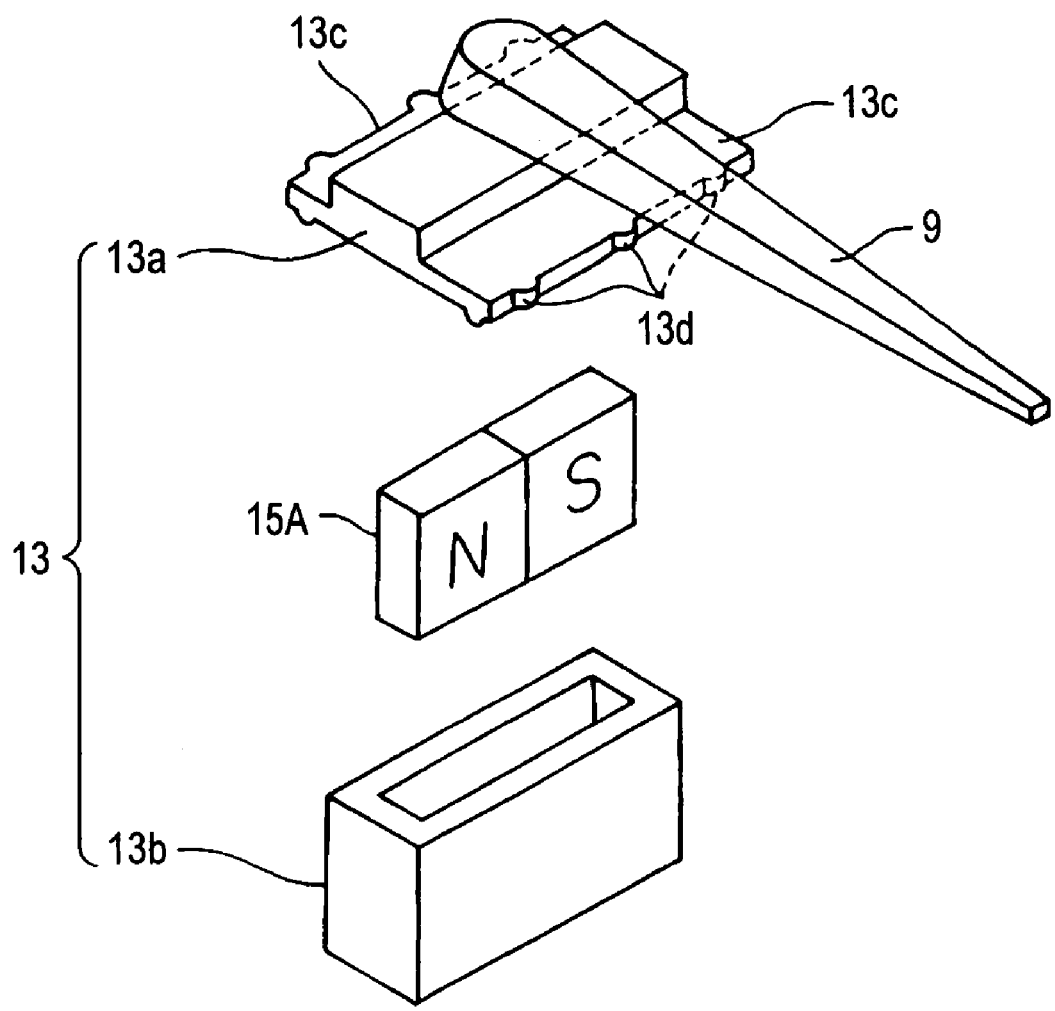
FIG. 18 is an exploded perspective view showing the mover, as shown in FIG. 17, in an enlarged scale.

As shown by an exploded perspective view in an enlarged scale in FIG. 18, the multipolar magnet 15A has one N-pole and one S-pole, the spacing of which is equal to that between the adjoining magnetic pole teeth 17f and 17f of the coil unit 17C.

Here in this embodiment, the mover 13 for housing the multipolar magnet 15A is modified in constitution to have the guide members 13c and 13c in the upper case 13a.

Figure 19:
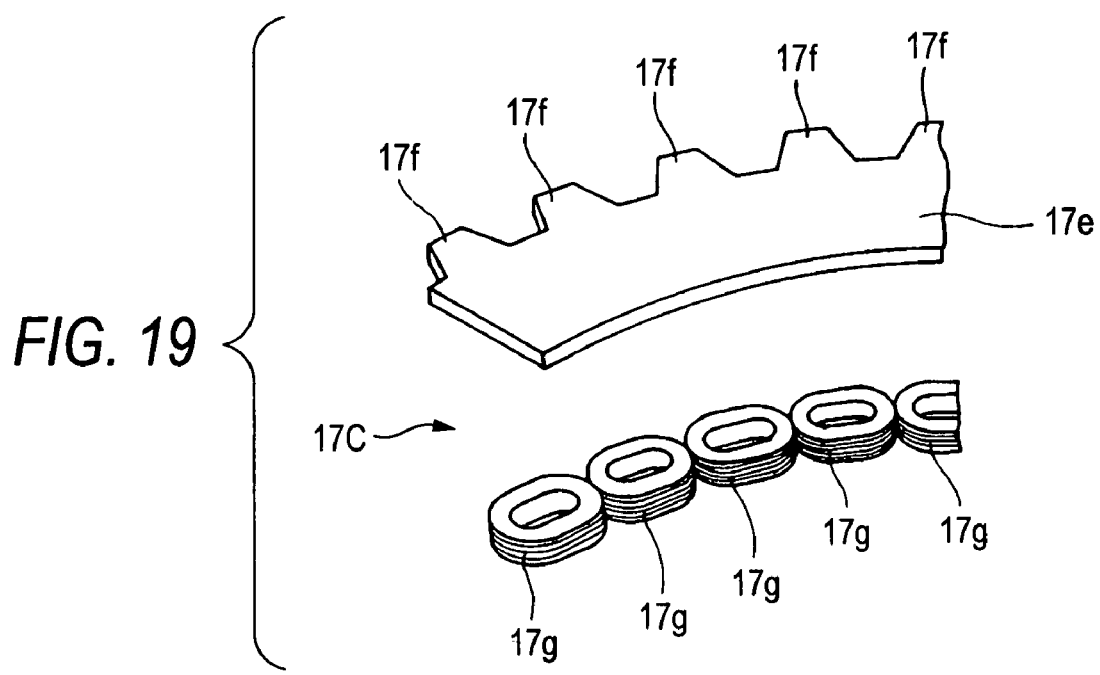
FIG. 19 is an exploded perspective view of the coil assembly, as shown in FIG. 17, in an enlarged scale.

As shown by an exploded perspective view in an enlarged scale in FIG. 19, the coil unit 17C includes a plurality of a yoke 17e having a plurality of magnetic pole teeth 17f, 17f, - - -, and so on (corresponding to poles in claims) formed at an equal spacing (corresponding to a predetermined spacing in claims) at the outer periphery, and a plurality of steps of coils 17g, 17g, - - -, and so on corresponding one by one to the individual magnetic pole teeth 17f, 17f, - - -, and so on.

Here in this embodiment, the aforementioned coil unit 17C corresponds to a coil in claims.

Figure 20:
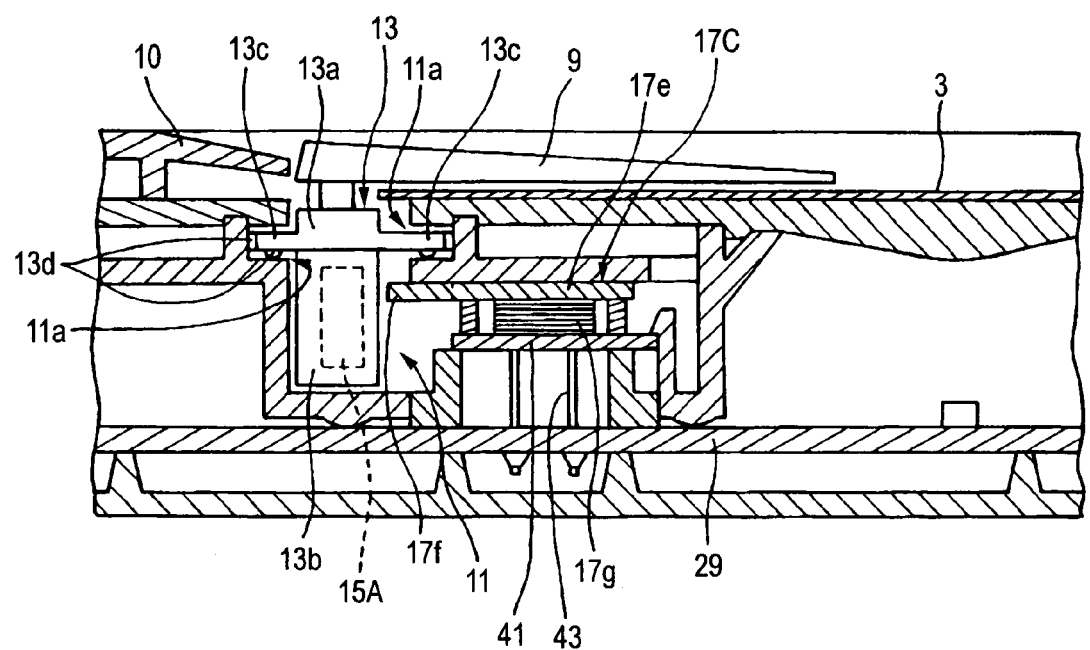
FIG. 20 is an enlarged sectional view showing the inside of the guide groove portion shown in FIG. 16.

As shown by a sectional view in an enlarged scale in FIG. 20, each of the coils 17g is arranged to have its one end face abutting against a portion near the corresponding magnetic pole tooth 17f of the yoke 17e. The power source for energizing the magnetic pole tooth 17f is fed from the micom μ COM or the driver drv of FIG. 6 through a pin 43 extending through a support plate 41, against which the other end face of each coil 17g abuts, and the mounting substrate 29, to which that pin 43 is soldered.

The power source, as fed to each coil 17g of the coil unit 17C from the micom μ COM or the driver drv, has sinusoidal waves having phases displaced by 180 degrees from the power source fed to the adjoining coil 17g. By the feed of the sinusoidal waves, each magnetic pole tooth 17f of the coil unit 17C is energized to the magnetic pole reversed from that of the adjoining coil by the magnetic flux generated in each corresponding coil 17g.

When each of the coils 17g is fed with the sinusoidal waves having a phase different by 180 degrees from that of the adjoining coil 17g, the mover 13 is caused to move from the side of the other end 11c to the side of the one end 11b of the guide groove portion 11 by the positional relation between the magnetic pole generated at each of the magnetic pole teeth 17f, 17f, - - -, and so on of the coil unit 17C and the magnetic pole of the multipolar magnet 15, so that the needle 9 indicates a high speed in the graduation portion 7.

When the direction of the sinusoidal waves to be fed to each of the coils 17g is reversed, the mover 13 is caused to move from the side of the one end 11b to the side of the other end 11c of the guide groove portion 11 by the positional relation between the magnetic pole generated at each of the magnetic pole teeth 17f, 17f, - - -, and so on of the coil unit 17C and the magnetic pole of the multipolar magnet 15, so that the needle 9 indicates a low speed in the graduation portion 7.

In the meter 1 thus constituted according to the second embodiment, when the individual coils 17g, 17g, - - -, and so on of the coil unit 17C are energized, the mover 13 moves in the guide groove portion 11 in the direction corresponding to the energizing direction and to an extent corresponding to the quantity of energization so that the indication of the graduation portion 7 by the needle 9 changes.

At this time, the linear motor unit for moving the mover 13 or the needle 9 is constituted to include the guide groove portion 11 positioned on the outer periphery of the graduation portion 7, the coil unit 17C disposed in the guide groove portion 11, and the multipolar magnet 15A housed in the mover 13. The guide groove portion 11 can be easily formed between the dial 3 and the facing 10, and the coil unit 17C can be easily constituted to have the yoke 17e forming the magnetic pole teeth 17f, 17f, - - -, and so on, and the coils 17g, 17g, - - -, and so on corresponding to the magnetic pole teeth 17f, 17f, - - -, and so on and abutting at their one-ends against the yoke 17e. As a result, the necessity for selecting and designing the constitution to match the layout of the moving area of the needle 9 over the meter 1 can be suppressed as much as possible to facilitate the constitution and to share the parts.

Figure 21:
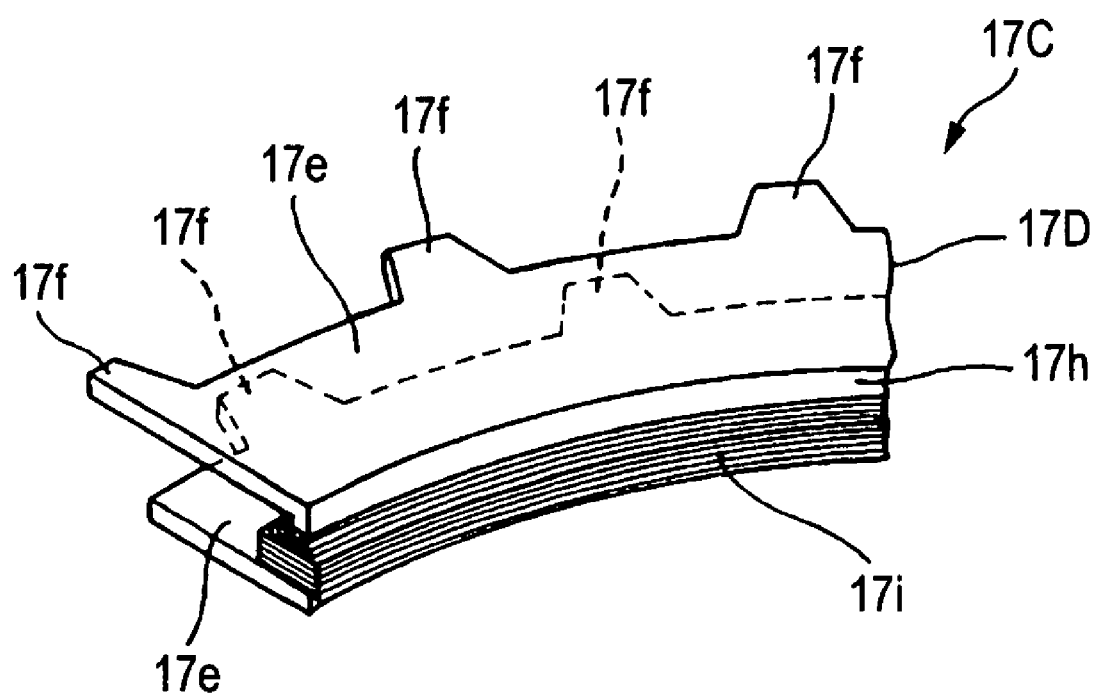
FIG. 21 is an enlarged perspective view of a coil assembly of a meter according to a modification of the second embodiment of the invention.

Here, in a modification of the second embodiment as shown by an enlarged perspective view in FIG. 21, the aforementioned coil unit 17C may be modified by a coil assembly 17D. This coil assembly 17D is constituted such that the upper and lower two yokes 17e and 17e having the magnetic pole teeth 17f, 17f, - - -, and so on (corresponding to poles in claims) formed on the outer peripheral edges at a spacing (corresponding to a predetermined spacing in claims) twice as large as the spacing from the adjoining magnetic tooth 17f in the yoke 17e of the second embodiment, as shown in FIG. 19, are so integrated by connecting them by a connecting portion 17h on the inner peripheral edge sides that the positions of the upper and lower magnetic pole teeth 17f, 17f, - - -, and so on are displaced by the distance between the adjoining magnetic pole teeth 17f in the yoke 17e of the second embodiment shown in FIG. 19, that is, one half (corresponding to one half of a predetermined spacing in claims) of the spacing between the adjoining two magnetic pole teeth 17f in the yoke 17e of the second embodiment shown in FIG. 19, and such that a single coil 17j is wound on that connecting portion 17h. The coil assembly 17D thus constituted may be used as the aforementioned coil unit 17C.

If this coil assembly 17D is used as the coil unit 17C, the reverse magnetic poles are generated at the magnetic pole teeth 17f of the upper and lower yokes 17e and 17e when the coil 17j is energized with the sinusoidal waves. Moreover, the positions of the magnetic pole teeth 17f of the upper and lower yokes 17e and 17e are displaced by one half of the spacing between the two adjoining magnetic pole teeth 17f of the upper yoke 17e and the lower yoke 17e. Therefore, it is unnecessary, unlike the meter 1A of the second embodiment, to provide the coils 17g, 17g, - - -, and so on in a manner to correspond to the magnetic pole teeth 17f, 17f, - - -, and so on, and to energize each of the coils 17g with the sinusoidal waves having phases different by 180 degrees from those of the adjoining coil 17g, but it is sufficient to energize the signal coil 17j with only the sinusoidal waves. Thus, this constitution is advantageous because the electric constitution and control can be simplified.

Figure 22:
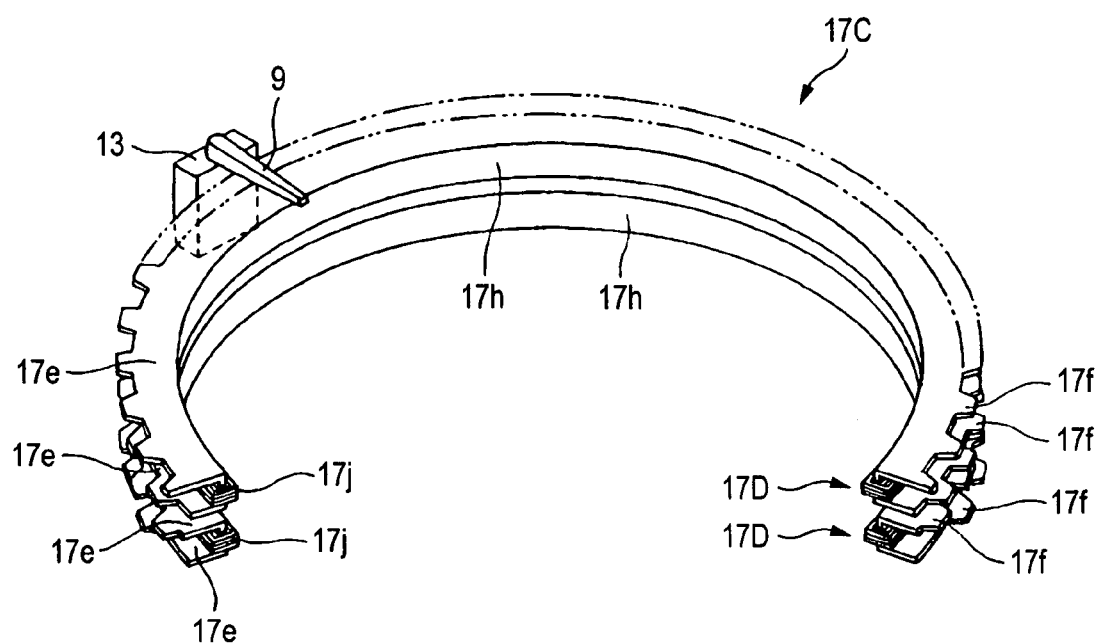
FIG. 22 is an enlarged perspective view of a coil assembly of a meter according to another modification of the second embodiment of the invention.

On the other hand, the aforementioned coil assembly 17D of FIG. 21 may be constituted, as another modification of the second embodiment shown by a perspective view in FIG. 22, such that upper and lower two coil assemblies 17D are overlapped, and such that either the magnetic pole teeth 17f of the upper yoke 17e or the magnetic pole teeth 17f of the lower yoke 17e are arranged with a displacement of one quarter of the spacing between the adjoining two magnetic pole teeth 17f. The coil assembly 17D thus constituted may be used as the coil unit 17C, and its coil 17j may be energized by the sinusoidal waves.

The modifications of the second embodiment, as described with reference to FIG. 21 and FIG. 22, need not always be adopted. If adopted, however, the electric constitution and control on the coil energization can be simplified, and the position of the mover 13 in the guide groove portion 11 can be managed in a resolution two times or four times as high as that of the spacing between the adjoining magnetic pole teeth 17f of the yoke 17e. This constitution is advantageous, because the indicated position of the needle 9 can be managed in a high resolution.

In the foregoing individual embodiments and their modifications, moreover, the descriptions have been made on the meter, in which the graduation portion is arranged in the arcuate shape, for example. However, the invention can also be applied to a meter, in which the graduation portion is arranged straight.

In the foregoing individual embodiments and their modifications, moreover, the descriptions have been made on the meter of the centerless type, which is used as the combination meter of the vehicle. However, the invention can also be applied to not only the vehicular meter but also a meter in another field, if the meter is of the centerless type, in which the indication is made by the needle extending from the outer side to the inner side of the graduation portion.

What is claimed is:

1. A centerless meter for indicating a position of a graduation portion arranged on a dial associated with a measured value, with a needle extending from an outer side to an inner side of said graduation portion, comprising:
   a guide groove portion formed in the outer side of said dial and extending along said graduation portion;
   a mover housed in said guide groove portion so as to be movable along said guide groove portion;
   said needle attached to said mover; and
   a moving device for moving said mover relative to said guide groove portion and along said guide groove portion,
   wherein said moving device includes:
   a multipolar magnet attached to a first member that is one of said guide groove portion and said mover and having at least one set of N-poles and S-poles arranged adjacent to each other;
   a coil attached to a second member that is the other of said guide groove portion and said mover for generating magnetic poles at the poles arranged to confront said multipolar magnet; and
   a power source for switchably energizing said coil such that magnetic poles are generated alternately over successive ones of the poles; and
   said multipolar magnet or said coil attached to said guide groove portion are arranged in said guide groove portion over a whole moving range in which said mover moves in the guide groove portion.

2. A meter according to claim 1, wherein said first member is said guide groove portion and the second member is said mover,
   the N-poles and the S-poles of said multipolar magnet to be attached to said guide groove portion are arranged alternately in a plurality of sets over the whole moving range of said mover in said guide groove portion,
   said mover carries two of said coils, and
   the successive ones of said poles of each coil confront said multipolar magnet with a spacing of one half of the spacing the adjoining N-pole and S-pole of said multipolar magnet along said guide groove portion.

3. A meter according to claim 1, wherein said first member is said guide groove portion and said second member is said mover, and
   said coil carried by said mover is connected with a leading end of an electric wiring, which is let off from a first end side to a second end side of the moving range of said mover in said guide groove portion and which can reach said coil in case said mover is positioned at the second end of said guide groove portion.

4. A meter according to claim 3, further comprising a tension mechanism for urging said leading end of said electric wiring from said second end side toward said first end side of said guide groove portion.

5. A meter according to claim 1, wherein said first member is said guide groove portion and said second member is said mover,
- a feeding conductive pattern extends in said guide groove portion over the whole moving range of said mover, and
- said mover is provided with an electric receiving brush electrically connected with said coil by sliding on said feeding conductive pattern associated with movement of said mover along said guide groove portion.

6. A meter according to claim 1, wherein said first member is said mover and said second member is said guide groove portion, and
said individual poles of said coil to be attached to said guide groove portion are arranged over the whole moving range of said mover in said guide groove portion at a predetermined spacing from the successive poles along said guide groove portion,
said multipolar magnet is attached to said mover, and
the adjoining N-pole and S-pole of said multipolar magnet are arranged at a spacing twice as long as said predetermined spacing along said guide groove portion.

7. A meter according to claim 6, wherein said coil includes one or more coil assemblies, in which yokes having a plurality of poles arranged at a predetermined spacing along said guide groove portion are individually arranged on two ends of a center axis direction of said coil with a displacement corresponding to one half of said predetermined spacing along said guide groove portion.

* * * * *